United States Patent
Claes

[11] Patent Number: 5,769,584
[45] Date of Patent: Jun. 23, 1998

[54] NUT FOR A SPOKE

[75] Inventor: Ivo Claes, Knokke-Heist, Belgium

[73] Assignee: Piminvest, Naamloze vennootschap, Wilrijk, Belgium

[21] Appl. No.: 792,215

[22] Filed: Jan. 31, 1997

[30]    Foreign Application Priority Data

Jan. 31, 1996  [BE]  Belgium ................................ 9600084

[51] Int. Cl.⁶ ............................. F16B 37/00; F16B 43/02
[52] U.S. Cl. ......................... 411/427; 411/410; 411/537; 301/58
[58] Field of Search ................................... 411/380, 381, 411/427, 537, 410; 301/58, 69, 70, 81

[56]            References Cited

U.S. PATENT DOCUMENTS 2,937,905   5/1960  Altenburger .............................. 301/58
3,524,413   8/1970  Versman ............................... 411/537 X
4,275,931   6/1981  Reppert ................................ 301/58 X
4,583,787   4/1986  Michelotti ............................ 301/70 X
4,824,177   4/1989  Aloy .......................................... 301/58
5,542,777   8/1996  Johnson .............................. 411/537 X Primary Examiner—Neill R. Wilson
Attorney, Agent, or Firm—Bacon & Thomas

[57]              ABSTRACT

A nut for a spoke of a spoked wheel includes an elongated, hollow, internally threaded body having flattened side faces and which progresses to an enlarged head portion along a rounded collar that permits self-alignment of the nut in a spoke hole of a wheel rim when the spoke is tensioned by the nut.

7 Claims, 3 Drawing Sheets

NUT FOR A SPOKE

BACKGROUND OF THE INVENTION

1. Field of the Invention

The present invention relates to a nut which can be screwed on the threaded extremity of a wheel spoke, in order to, by means of several such spokes and nuts, appropriately connect a wheel rim to a wheel hub.

2. Discussion of Related Art

Nuts of the above-described type are applied in all sorts of spoked wheels, such as bicycles, mopeds, motorcycles, automobile wheels and the like.

Indeed, it can be said that the combination of spoke and nut, in short, a spoke-nut unit, has an important if not the most important role of the wheel components.

A first function of the spoke-nut unit in the wheel is, of course, the suspension of the wheel hub by means of its hub flanges in the center of the rim.

A second function is balancing of the wheel, or bringing the different forces acting on the wheel in harmonic balance so that the wheel does not oscillate, in other words that each part of the rim is free of lateral forces and that, during the rotation of the wheel, the rim remains in one and the same plane.

A third important function of the spoke-nut unit is bringing the wheel spokes under tension in such a way that external forces, including the weight of the vehicle, the users and the luggage, as well as any additional dynamic impact loads formed by the state of the road surface, are absorbed.

Precisely the latter two functions add to the quality and hence the corresponding life of a spoked wheel.

These functions are nowadays subjected to very strict criteria, mainly because more than before the range of bicycle models is evermore expanding, whereby the rims and hubs are lighter and take several different forms and dimensions, the number of spokes has decreased, and the necessary spoke tension has increased.

In prior art devices, the nut is formed by a cylindric body that terminates at a head portion with a transitional conical nut collar which fits, together with a part of the body, in a seat in the rim formed by a hole in the rim, with possibly a suitable lining therein.

A frequently experienced problem with a spoke-nut unit is the fact that the longitudinal axis of the nut, after it is tensioned, does not coincide with the longitudinal axis of the spoke. This may be due to bore directions of the rim holes which are not adjusted to the form and dimensions of the hub and/or due to forces appearing in radial directions, parallel to the wheel plane, and/or in axial directions, along or parallel to the axis of the wheel.

This error generally cannot be corrected with existing nuts, since they are clamped with their conical collar in their lining in the rim, and therefore have too little or even no axial and/or radial tolerance.

The result thereof is that the spoke does not undergo pure tension force along its longitudinal axis, but, due to lateral forces, is subjected to a bending-stress at the extremity of the nut resulting in the spoke failing much too soon.

The present invention aims at totally excluding the above-mentioned and other disadvantages.

BRIEF SUMMARY OF THE INVENTION

The nut according to the invention mainly consists of a body having flattened faces towards one end and which transforms or transitions into a head portion at it other end via a rounded collar. The nut is hollow and provided with an internal screw-thread.

This results in the nut, due to its rounded collar, together with its seat in the rim, forming a sort of ball-andsocket joint whereby the nut has a maximal freedom of pivotal movement, in both axial and radial directions.

This offers the advantage that the nut can move in the corresponding rim hole and can thus move into alignment with loads on the spoke so that the internal tensions in the corresponding spoke are limited to pure tensile loads and the risk of cracks or fractures is drastically decreased, possibly even removed.

Another advantage is the fact that wrongly bored rim holes, or rim holes that are not perfectly situated relative to the hub, can be corrected by the automatic alignment of the nut along the axis of the spoke.

An additional advantage is the fact that one and the same nut can be used for different sizes and shapes of rim holes and hubs.

BRIEF DESCRIPTION OF THE DRAWINGS

In order to better show the characteristics of the invention, some preferred embodiments are described hereafter, as examples and without any limitative character whatsoever, reference being made to the accompanying drawings, in which:

FIG. 5 shows a conventional elevation view of FIG. 1 taken from the rear of the wheel.

DETAILED DESCRIPTION OF THE PREFERRED EMBODIMENT

Figure 1:
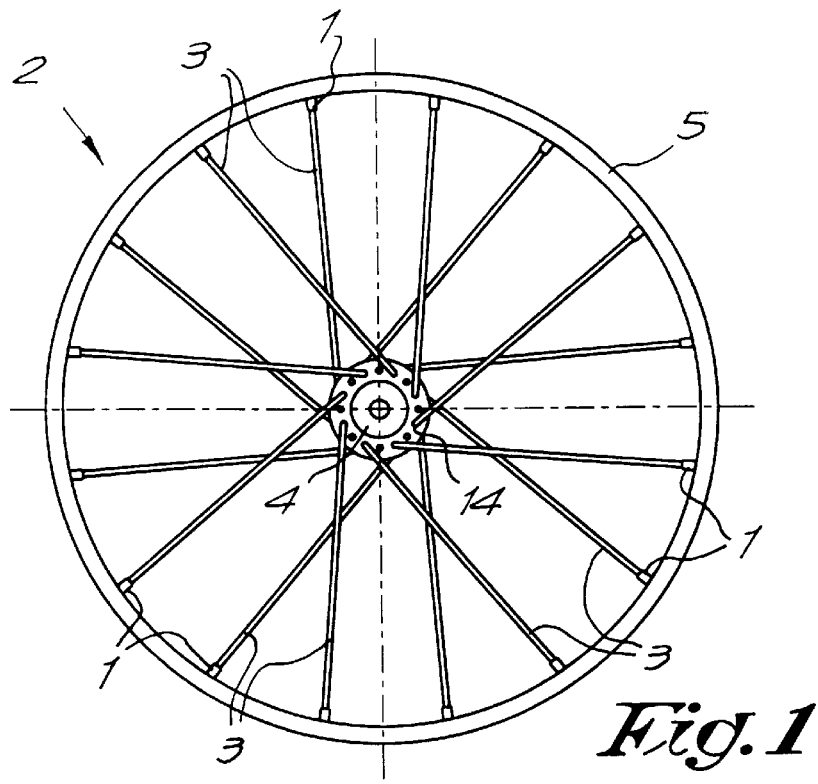
FIG. 1 shows a side view of a wheel using nuts according to the invention.

As represented in FIG. 1, a nut 1 forms part of a wheel 2, for instance a bicycle wheel, whereby the nut 1 contributes, in combination with a corresponding spoke 3, to the central suspension of a hub 4 in a rim 5.

Figure 2:
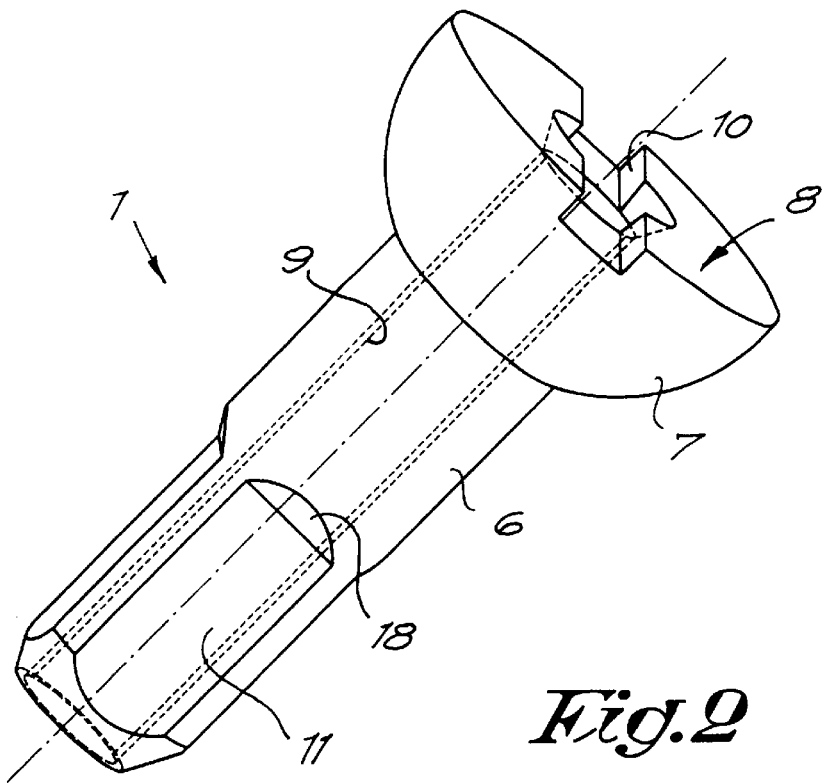
FIG. 2 shows, at a larger scale and in a perspective view, a nut according to a preferred embodiment of the invention.

As shown in FIG. 2, the nut 1 mainly consists of an elongated body 6 that transforms or transitions via a collar 7 into a head portion 8 at one end of the body.

The nut 1 is constructed hollow and is provided with an internal screw-thread 9. The upper side or outer end of the head 8 includes a transverse groove 10 with which a screwdriver can cooperate. The lower part of the body 6 opposite to the head portion has four flattened side faces 11 with which an appropriate nut spanner can cooperate.

Figure 3:
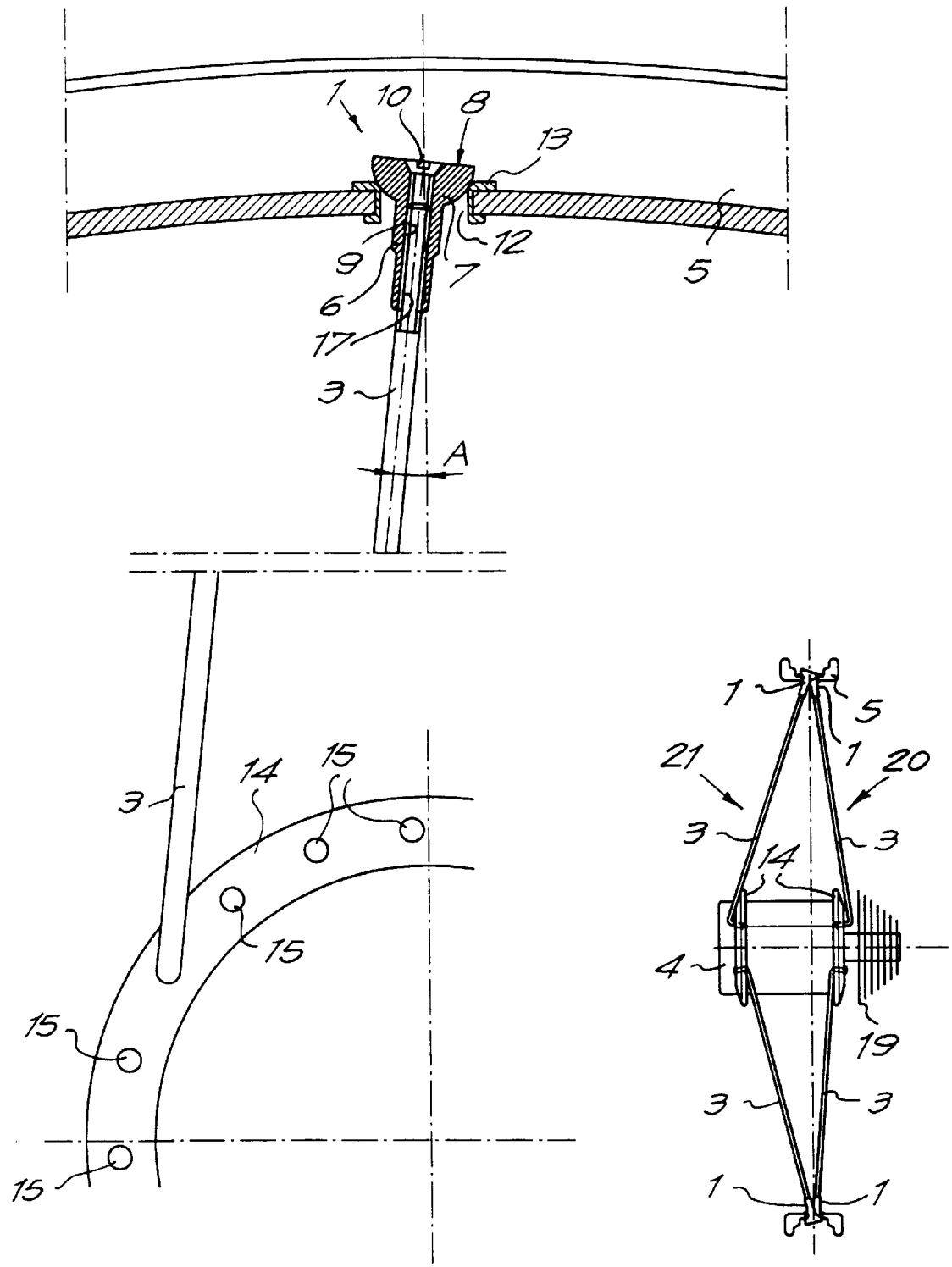
FIG. 3 shows a side view of a spoke-nut unit according to the invention.
Figure 4:
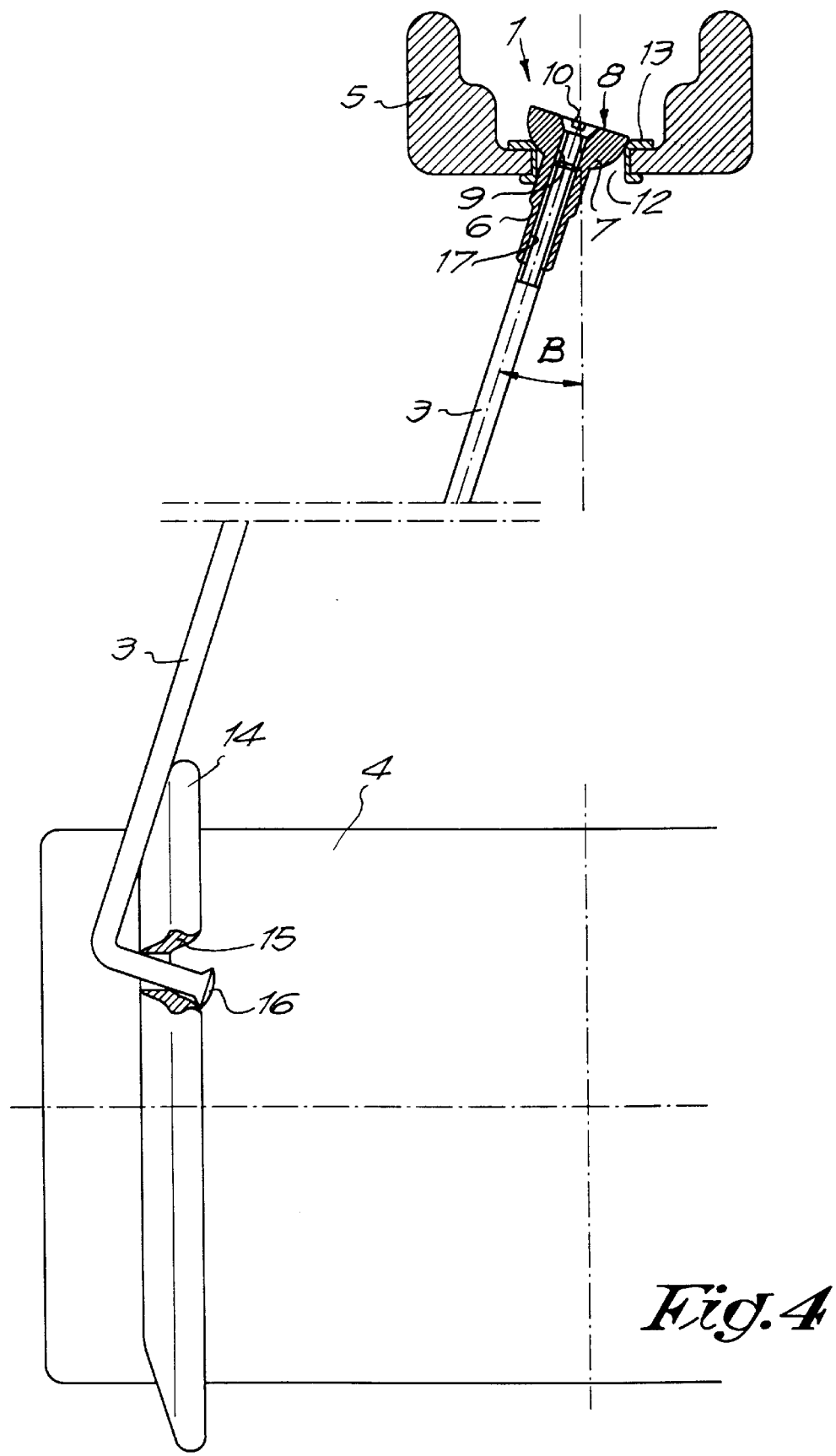
FIG. 4 shows an elevation sectional view of the spoke-nut unit according to the invention, as viewed from the front or rear of the wheel.

As shown in FIGS. 3 and 4, the rim 5 is provided along its entire circumference with rim holes 12 which are preferably all reinforced with a lining 13 and in which the nut 1 rests with its collar 7. The rim hole 12 forms, together with the lining 13, the seat for the collar of the nut 1.

The hub 4 of the wheel 2 shows at each extremity disc-shaped flanges 14 which are provided along their entire circumference with flange holes 15 in which spokes 3 are inserted. A spoke head 16 assures that the spoke 3 is anchored in the flange 14. The extremity of the spoke 3 that is provided with the spoke head 16 is bent over at an angle of 90 degrees so that the longitudinal axis of the spoke 3 is directed towards a corresponding nut 1 in the rim 5, whereby this nut 1 is screwed over a threaded extremity 17 of the spoke 3.

The uniqueness of the invention is that the collar 7 of the spoke 1 is partly rounded on its outer side between the body and the head portion, the curvature of the rounded portion preferably being spherical.

Thus the nut 1 can move around the axis of the rim hole, both radially, i.e., in the wheel plane, and axially, i.e., perpendicularly on the wheel plane, and can thus easily align itself with the force combination within the spoke 3.

This is contrary to known prior art nuts where the collar has a more conical shape and is thus almost motionlessly clamped in the rim hole in alignment with the axis of the rim hole.

In the case where the directions of the longitudinal axis of the spoke and the nut do not correspond, which is mostly the case when the wheel is dynamically loaded, the spoke will undergo a bending at the intersection with the nut, which leads to an undesired excessive internal bending-stress in the spoke, resulting in a spoke fracture.

With the nut 1 according to the invention, a radial variance or misalignment A and an axial variance or misalignment B, between the longitudinal axis of the nut and the axis of the rim hole of up to approximately 10 degrees is possible, which is enough to enable absorption of all static and dynamic wheel loads.

The possibility of the nut to perform both radial and axial corrections is also especially useful when using so-called super hubs, having seven to eight toothed sprocket wheels 19, resulting in a rear wheel having a strong asymmetry, as shown in FIG. 5. As a result, the spokes at a gearwheel side 20 are less long and extend to the rim at a smaller axial angle than those on the other side 21 of the rear wheel.

In a preferred embodiment the flattened faces 11 of the body 6 will transition into the main body portion along slanting faces 18. This results in the useful surface of the faces 11 being maximal so that a nut spanner, with which the tensile stress in the spoke can be regulated, grips better.

The nuts are preferably made of brass or aluminum which offers the additional advantage that the nuts can be anodized and/or colored.

The present invention is in now way limited to the embodiments described above and represented in the drawings, but such nut can be realized in different variants, forms and dimension without leaving the scope of the invention.

I claim:

1. A spoke nut comprising:

an elongated body having flattened side faces at one end area and an enlarged head portion at an opposed end of the body;

said head portion including a collar portion having a rounded portion forming a transition between the body and the head portion;

a longitudinal threaded bore within the body;

wherein said flattened faces transition gradually into the nut body along inclined surfaces extending in the direction towards the head portion.

2. In a securing system for spokes of a spoked wheel including a rim and a hub and multiple spokes terminating at threaded outer ends located adjacent openings in the wheel rim and spoke nuts threaded on the spoke terminal ends so that the spoke nuts extend through the wheel rim openings and serve to tension the spokes between the wheel hub and the wheel rim, the improvement comprising:

said nuts comprising an elongated body having flattened side faces at one end area and an enlarged head portion at an opposed end of the body;

said head portion including a collar portion having a rounded portion forming a transition between the body and the head portion;

a longitudinal threaded bore within the body;

said wheel rim opening being sufficiently larger in transverse directions relative to the body of each nut so as to provide a space between each nut body and each opening in the wheel rim that enables pivotal motion of the body in the opening with the collar portion of the nut in engagement with the wheel rim adjacent the opening on the side thereof opposite the side facing each respective spoke.

3. The improvement as recited in claim 2, wherein each said opening in each said collar accommodates up to a 10° misalignment of the nut longitudinal axis in the wheel rim opening in which the nut is installed in both a radial direction within the plane of the rim and an axial direction relative to the rim.

4. The improvement as recited in claim 2, wherein said flattened faces transition gradually into the nut body along inclined surfaces extending in the direction towards the head portion.

5. The improvement according to claim 2, wherein the material forming the nut is selected from the group consisting of brass and aluminum.

6. The improvement according to claim 5, wherein the nut is made of anodized aluminum.

7. The improvement according to claim 6, wherein the anodized aluminum is colored.

* * * * *